United States Patent
Wakabayashi et al.

(10) Patent No.: US 6,762,217 B2
(45) Date of Patent: Jul. 13, 2004

(54) WATER-BASED INK

(75) Inventors: Shigemi Wakabayashi, Wakayama (JP); Yukihiro Nakano, Wakayama (JP)

(73) Assignee: Kao Corporation, Tokyo (JP)

( * ) Notice: Subject to any disclaimer, the term of this patent is extended or adjusted under 35 U.S.C. 154(b) by 86 days.

(21) Appl. No.: 10/166,129

(22) Filed: Jun. 11, 2002

(65) Prior Publication Data

US 2003/0032699 A1 Feb. 13, 2003

(30) Foreign Application Priority Data

Jun. 12, 2001 (JP) ........................................ 2001-177238

(51) Int. Cl.⁷ ........................ C09D 11/10; C08L 51/00; C08L 25/08; C08L 33/08; C08L 83/10
(52) U.S. Cl. ........................................ 523/160; 524/504
(58) Field of Search ................................. 523/160, 161; 524/504; 106/31.6, 31.15

(56) References Cited

U.S. PATENT DOCUMENTS

| | | | |
|---|---|---|---|
| 3,462,388 A | * | 8/1969 | Horiguchi et al. ............ 8/647 |
| 4,234,466 A | * | 11/1980 | Takahashi et al. ........... 523/509 |
| 5,294,664 A | * | 3/1994 | Morrison, Jr. et al. ....... 524/560 |
| 5,536,762 A | | 7/1996 | Hinojosa |
| 5,719,204 A | * | 2/1998 | Beach et al. ................. 523/161 |
| 5,736,606 A | | 4/1998 | Yanagi et al. |
| 5,880,176 A | * | 3/1999 | Kamoto et al. ............. 523/172 |
| 5,998,501 A | * | 12/1999 | Tsutsumi et al. ........... 523/160 |
| 6,031,019 A | | 2/2000 | Tsutsumi et al. |
| 6,063,834 A | * | 5/2000 | Kappele et al. ............. 523/160 |
| 6,080,516 A | * | 6/2000 | Devlin et al. ................. 430/17 |
| 6,498,203 B1 | * | 12/2002 | Kito et al. .................. 523/161 |
| 2001/0023265 A1 | * | 9/2001 | Hidaka et al. ............... 523/161 |

FOREIGN PATENT DOCUMENTS

| | | |
|---|---|---|
| EP | 0 303 803 | 2/1989 |
| EP | 0 590 935 | 4/1994 |
| EP | 0 692 528 | 1/1996 |
| EP | 0 928 821 | 7/1999 |
| JP | 08-53640 | 2/1996 |
| JP | 08-225758 | 9/1996 |
| JP | 09-67531 | 3/1997 |
| JP | 09-78012 | 3/1997 |
| JP | 9-227817 | 9/1997 |
| JP | 9-249835 | 9/1997 |
| JP | 10-130558 | 5/1998 |

OTHER PUBLICATIONS

Patent Abstracts of Japan, JP 05–117571, May 14, 1993.

* cited by examiner

Primary Examiner—Callie Shosho
(74) Attorney, Agent, or Firm—Oblon, Spivak, McClelland, Maier & Neustadt, P.C.

(57) ABSTRACT

A water-based ink comprising an aqueous dispersion of polymer particles comprising a polymer obtained by a solution polymerization, a bulk polymerization method or a suspension polymerization method, and a fluorescent colorant. The water-based ink can be suitably used as a water-based ink for inkjet recording and the like.

5 Claims, No Drawings

WATER-BASED INK

BACKGROUND OF THE INVENTION

1. Field of the Invention

The present invention relates to a water-based ink. More specifically, the present invention relates to a water-based ink which can be suitably used as a water-based ink for inkjet recording and the like.

2. Discussion of the Related Art

As water-based fluorescent ink compositions, there have been proposed an ink composition prepared by dissolving a water-soluble fluorescent dye in an aqueous medium as disclosed in Japanese Patent Laid-Open No. Hei 09-249835; an ink composition prepared by dispersing a fluorescent pigment in an aqueous medium or an organic solvent with a surfactant or a dispersant as disclosed in Japanese Patent Laid-Open No Hei 10-130558; an ink composition prepared by adsorbing an oil-soluble fluorescent dye to fine solid particles as disclosed in Japanese Patent Laid-Open No. Hei 09-78012; and ink composition prepared by incorporating an oil-soluble fluorescent dye into polymer particles by emulsion polymerization as disclosed in Japanese Patent Laid-Open No. Hei 08-53640; and the like.

However, there are some defects in the ink composition prepared by simply dissolving the water-soluble fluorescent dye in the aqueous medium such that the water resistance of the printouts is insufficient, and that its fluorescent intensity is affected by the environment, especially humidity, and the like. In addition, there are some defects in the ink composition prepared by dispersing the fluorescent pigment in the aqueous medium or the organic solvent with the surfactant or the dispersant such that clogging is generated in the nozzles in the inkjet recording, and that the ink composition has deteriorated jetting stability, so that sediments are generated when the ink is stored for a long period of time.

Also, there are some defects in the ink composition prepared by adsorbing the oil-soluble fluorescent dye to the fine solid particles such that the amount of the dye which can be adsorbed is small, so that the ink composition has a low fluorescent intensity. Moreover, there are some defects in the ink composition prepared by incorporating the oil-soluble fluorescent dye into the polymer particles such that the amount of the dye which can be incorporated is small, so that printouts have a low fluorescent intensity and a low optical density.

An object of the present invention is to provide a water-based ink which gives printouts a sufficient fluorescent intensity and excellent water resistance and environmental resistance, and is excellent in storage stability for a long period of time.

Another object of the present invention is to provide a water-based ink for inkjet recording ensuring stable ink jetting property in the inkjet recording.

These and other objects of the present invention will be apparent from the following description.

SUMMARY OF THE INVENTION

According to the present invention, there is provided a water-based ink comprising an aqueous dispersion of polymer particles comprising a polymer obtained by a solution polymerization, a bulk polymerization method or a suspension polymerization method, and a fluorescent colorant

DETAILED DESCRIPTION OF THE INVENTION

The water-based ink of the present invention comprises polymer particles comprising a polymer obtained by a solution polymerization method, a bulk polymerization method or a suspension polymerization method. Therefore, printouts obtained from the water-based ink exhibit sufficient fluorescent intensity, excellent water resistance and excellent environmental resistance, and the water-based ink is also excellent in storage stability for a long period of time. Further, stable inkjetting property is secured in inkjet recording.

When the fluorescent colorant is contained in the polymer particles, the content of the fluorescent colorant in the water-based ink can be increased. Therefore, the fluorescent intensity and optical density obtained from the water-based ink can be enhanced, and its water resistance and environmental resistance can be increased.

In addition, when an oil-soluble fluorescent dye or a fluorescent disperse dye is used as the fluorescent colorant, the water resistance of the printouts can be improved.

Further, when a vinyl-based graft copolymer (hereinafter simply referred to as "graft copolymer") is used as the polymer, there is an advantage that a large amount of the fluorescent colorant can be stably contained in the graft copolymer.

It is preferable that the graft copolymer has at least one branched chain selected from the group consisting of styrenic polymers such as styrene-acrylonitrile copolymers, alkyl (meth)acrylate polymers (the term "(meth)acrylate" as referred to herein means "acrylate" and/or "methacrylate," hereinafter referred to the same), alkylene oxide adduct polymers, and polysiloxanes, because a large amount of the fluorescent colorant can be stably contained in the graft copolymer, and stable inkjetting property can be exhibited in ink-jet recording.

The graft copolymer having a branched chain of a styrenic polymer can be obtained by copolymerizing a mixture comprising a styrenic macromer, a polymerizable unsaturated monomer having a salt-forming group and a monomer copolymerizable with the styrenic macromer and the polymerizable unsaturated monomer having a salt-forming group in the presence of a radical polymerization initiator.

The styrenic macromer includes a styrenic macromer comprising a styrene homopolymer having a polymerizable functional group at one end; a styrenic macromer having a polymerizable functional group at one end comprising a copolymer of styrene and a polymerizable unsaturated monomer such as acrylonitrile, the macromer; and the like.

In the styrenic macromer having a polymerizable functional group at one end, the polymerizable functional group includes, for instance, vinyl group and the like.

It is desired that the number-average molecular weight of the styrenic macromer is 500 to 30000, preferably 1000 to 10000, from the viewpoints of the content of the fluorescent colorant, storage stability and viscosity of an ink.

Representative examples of the styrenic macromer having a polymerizable functional group at one end include a styrene homopolymer having a vinyl group at one end (e.g. one commercially available from TOAGOSEI CO., LTD. under the trade name of AS-6, and the like); a styrene-acrylonitrile (molar ratio: 1/1) copolymer having a vinyl group at one end (e.g. one commercially available from TOAGOSEI CO., LTD. under the trade name of AN-6, number-average molecular weight: 6000, and the like), and the like.

Representative examples of the polymerizable unsaturated monomer having a salt-forming group include cationic monomers, anionic monomers, and the like.

Representative examples of the cationic monomer include unsaturated cyclic amines, tertiary amine-containing unsaturated monomers, ammonium salt-containing unsaturated monomers, and the like.

Concrete examples of the cationic monomer include:

monovinylpyridines such as vinylpyridine, 2-methyl-5-vinylpyridine and 2-ethyl-5-vinylpyridine;
styrenes having a dialkylamino group, such as N,N-dimethylaminostyrene and N,N-dimethylaminomethylstyrene;
acrylates or methacrylates having a dialkylamino group, such as N,N-dimethylaminoethyl acrylate, N,N-dimethylaminoethyl methacrylate, N,N-diethylaminoethyl acrylate, N,N-diethylaminoethyl methacrylate, N,N-dimethylaminopropyl acrylate, N,N-dimethylaminopropyl methacrylate, N,N-diethylaminopropyl acrylate and N,N-diethylaminopropyl methacrylate;
vinyl ethers having a dialkylamino group, such as 2-dimethylaminoethyl vinyl ether;
acrylamides or methacrylamides having a dialkylamino group such as N-(N',N-dimethylaminoethyl)acrylamide, N-(N',N'-dimethylaminoethyl)methacrylamide, N-(N',N'-diethylaminoethyl)acrylamide, N-(N',N'-diethylaminoethyl)methacrylamide, N-(N',N'-dimethylaminopropyl)acrylamide, N-(N',N'-dimethylaminopropyl)methacrylamide, N-(N',N'-diethylaminopropyl)acrylamide, and N-(N',N'-diethylaminopropyl)methacrylamide;
compounds prepared by quaternarizing those monomers with a quaternarizing agent such as an alkyl halide having an alkyl group of 1 to 18 carbon atoms and a halogen atom such as chlorine atom, bromine atom or iodine atom;
a benzyl halide such as benzyl chloride or benzyl bromide;
an alkyl ester having 1 to 18 carbon atoms prepared from an alkylsulfonic acid such as methanesulfonic acid or an arylsulfonic acid such as benzenesulfonic acid or toluenesulfonic acid; and
a dialkyl sulfate having an alkyl group of 1 to 4 carbon atoms, and the like.

Representative examples of the anionic monomer include unsaturated carboxylic acid monomers, unsaturated sulfonic acid monomers, unsaturated phosphate monomers, and the like.

Concrete examples of the anionic monomer include:

unsaturated carboxylic acid monomers such as acrylic acid, methacrylic acid, crotonic acid, itaconic acid, maleic acid, fumaric acid, citraconic acid, 2-methacryloyloxymethyl succinic acid, and acid anhydrides or salts thereof;
unsaturated sulfonic acid monomers such as styrenesulfonic acid, 2-acrylamide-2-methylpropanesulfonic acid, 3-sulfopropyl (meth)acrylate, bis(3-sulfopropyl)-itaconate and salts thereof, monosulfates of 2-hydroxyethyl (meth)acrylic acid, and salts thereof;
unsaturated phosphate monomers such as vinylphosphonic acid, vinyl phosphate, bis(methacryloxyethyl) phosphate, diphenyl-2-acryloyloxyethyl phosphate, diphenyl-2-methacryloyloxyethyl phosphate, dibutyl-2-acryloyloxyethyl phosphate, dibutyl-2-methacryloyloxyethyl phosphate, dioctyl-2-acryloyloxyethyl phosphate and dioctyl-2-methacryloyloxyethyl phosphate; and the like.

The monomer copolymerizable with the styrenic macromer and the polymerizable unsaturated monomer having a salt-forming group includes, for instance, the followings:

acrylate monomers such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, decyl acrylate and dodecyl acrylate; methacrylate monomers such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, n-octyl methacrylate, decyl methacrylate and dodecyl methacrylate;
styrenic monomers such as styrene, vinyltoluene, 2-methylstyrene and chlorostyrene;
hydroxyl group-containing acrylates or hydroxyl group-containing methacrylates, such as 2-hydroxyethyl acrylate, 3-hydroxypropyl acrylate, polyethylene glycol acrylate, 2-hydroxyethyl methacrylate, 3-hydroxypropyl methacrylate and polyethylene glycol methacrylate; and the like.

As to the content of each monomer constituting the graft copolymer having a branched chain of a styrenic polymer, it is preferable from the viewpoints of emulsification stability, storage stability and dye-retaining property that the content of the styrenic macromer is 1 to 20% by weight, the content of the polymerizable unsaturated monomer having a salt-forming group is 2 to 40% by weight, and the content of the monomer copolymerizable with the styrenic macromer and the polymerizable unsaturated monomer having a salt-forming group is 40 to 97% by weight.

The polymerization can be carried out by any of a solution polymerization method, a bulk polymerization method and a suspension polymerization method. Among these polymerization methods, the solution polymerization method is preferable from the viewpoints of the physical properties of an ink, stable preparation and cost.

When the emulsion polymerization method is employed, the molecular weight of the resulting polymer becomes higher, and the amount of the fluorescent colorant contained in the polymer particles becomes smaller, so that printouts having a sufficient fluorescent intensity cannot be obtained. Also, since a surfactant used in the emulsion polymerization method, optical density and fluorescent intensity may be lowered.

It is preferable that the solvent used in the solution polymerization method is a polar organic solvent. Among the polar organic solvents, when a water-miscible organic solvent is used, the water-miscible organic solvent can also be used in admixture with water.

It is preferable that the medium used in the suspension polymerization method is water.

The polar organic solvent includes, for instance, aliphatic alcohols having 1 to 3 carbon atoms, such as methanol, ethanol and propanol; ketones such as acetone and methyl ethyl ketone; esters such as ethyl acetate; and the like. Among them, methanol, ethanol, acetone, methyl ethyl ketone and its mixed solvent with water are preferable.

Incidentally, a radical polymerization initiator can be used during the polymerization. As the radical polymerization initiator, azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile), and 1,1'-azobis(1-cyclohexanecarbonitrile) are preferable. In addition, organic peroxides such as t-butyl peroxyoctoate, di-t-butyl peroxide and dibenzoyl oxide can also be used as the radical polymerization initiator.

It is desired that the amount of the radical polymerization initiator is 0.001 to 5% by weight, preferably 0.01 to 2% by weight, more preferably 0.01 to 3% by weight, based on the total amount of the monomers.

During the polymerization, a polymerization chain transfer agent may be further added. Concrete examples of the polymerization chain transfer agent include mercaptans such as octyl mercaptan, n-dodecyl mercaptan, t-dodecyl mercaptan, n-tetradecyl mercaptan and mercaptoethanol; xanthogenndisulfides such as dimethyl xanthogenndisulfide and diisopropyl xanthogenndisulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, á-terpinene, á-terpinene, diterpene, á-methylstyrene dimer, 9,10-dihydroanthracene, 1,4-dihydronaphthalene, indene and 1,4-cyclohexadiene; unsaturated heterocyclic compounds such as 2,5-dihydrofuran; and the like. Those polymerization chain transfer agents can be used alone or in admixture of at least two kinds.

The conditions for polymerizing the monomers cannot be absolutely determined because the conditions differ depending upon the kinds and the amounts of the radical polymerization initiator, the monomers and the solvent used, and the like. It is desired that the polymerization temperature is usually 30° to 100° C., preferably 50° to 80° C., and that the polymerization time period is usually 1 to 20 hours. In addition, it is preferable that the polymerization is carried out in an atmosphere of an inert gas such as nitrogen gas.

After the termination of the polymerization reaction, the copolymer can be isolated from the reaction solution by a known method such as re-precipitation or solvent distillation. Also, unreacted monomers and the like can be removed from the resulting copolymer to purify by the repeat of re-precipitation, membrane separation, a chromatographic method, an extraction method or the like.

The graft copolymer having a branched chain of an alkyl (meth)acrylate polymer is obtained by copolymerizing a mixture of a macromer represented by the formula (I):

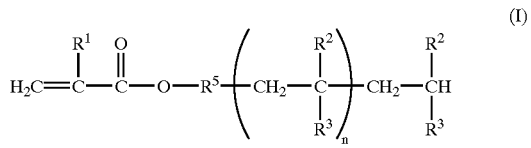

(I)

wherein $R^1$ is hydrogen atom or methyl group; $R^2$ is hydrogen atom or methyl group; $R^3$ is a group represented by —COOR$^4$, wherein $R^4$ is an alkyl group having 1 to 18 carbon atoms, preferably 7 to 18 carbon atoms; $R^5$ is a benzene ring, an aryl group having 7 to 18 carbon atoms or an alkylene group having 1 to 24 carbon atoms which may contain a hetero-atom; and n is an integer of 2 to 200, the polymerizable unsaturated monomer having a salt-forming group, and the monomer copolymerizable with the macromer represented by the formula (I) and the polymerizable unsaturated monomer having a salt-forming group in the presence of a radical polymerization initiator.

The macromer represented by the formula (I) includes those commercially available from TOAGOSEI CO., LTD. under the trade names of AU-6S, AA-6, AB-6, and the like.

The same monomers as those used for the above-mentioned graft copolymer having a branched chain of a styrenic polymer can be exemplified as the polymerizable unsaturated monomer having a salt-forming group.

The same monomers as those used for the above-mentioned graft copolymer having a branched chain of a styrenic polymer can be exemplified as the monomer copolymerizable with the macromer represented by the formula (I) and the polymerizable unsaturated monomer having a salt-forming group.

As to the content of each monomer in the graft copolymer having a branched chain of an alkyl (meth)acrylate polymer, it is preferable from the viewpoints of emulsification stability, storage stability and dye-retaining property that the content of the macromer represented by the formula (1) is 1 to 20% by weight, the content of the polymerizable unsaturated monomer having a salt-forming group is 2 to 40% by weight, and the content of the monomer copolymerizable with the macromer represented by the formula (I) and the polymerizable unsaturated monomer having a salt-forming group is 40 to 97% by weight.

The graft copolymer having a branched chain of an alkyl (meth)acrylate polymer can be prepared in the same manner as in the above-mentioned graft copolymer having a branched chain of a styrenic polymer.

The graft copolymer having a branched chain of an alkylene oxide adduct polymer is obtained by copolymerizing a macromer represented by the formula (II):

(II)

wherein $R^6$ is hydrogen atom or methyl group; $R^7$ is hydrogen atom, an alkoxy group having 1 to 18 carbon atoms or an aryloxy group having 6 to 18 carbon atoms, p is an integer of 2 to 4, and q is a number of 2 to 30, the polymerizable unsaturated monomer having a salt-forming group, and a monomer copolymerizable with the macromer represented by the formula (II) and the polymerizable unsaturated monomer having a salt-forming group in the presence of a radical polymerization initiator.

The macromer represented by the formula (II) includes those commercially available from Shin-Nakamura Chemical Co., Ltd. under the trade names of NK ESTER M-90G, AMP-60G, AM-90G; those commercially available from NOF Corporation under the trade names of Blemmer AE-400, PP-800, 50 PEP-300, 30 PET-800, 30 PPT-800, 50 POEP-800B, PSE-400, PNEP, and the like.

The same monomers as those used for the above-mentioned graft copolymer having a branched chain of a styrenic polymer can be exemplified as the polymerizable unsaturated monomer having a salt-forming group.

The same monomers as those used for the above-mentioned graft copolymer having a branched chain of a styrenic polymer can be exemplified as the monomer copolymerizable with the macromer represented by the formula (II) and the polymerizable unsaturated monomer having a salt-forming group.

As to the content of each monomer constituting the graft copolymer having a branched chain of an alkylene oxide adduct polymer, it is preferable from the viewpoints of emulsification stability, storage stability and dye-retaining property that the content of the macromer represented by the formula (II) is 1 to 40% by weight, the content of the polymerizable unsaturated monomer having a salt-forming group is 2 to 40% by weight, and the content of the monomer copolymerizable with the macromer represented by the formula (II) and the polymerizable unsaturated monomer having a salt-forming group is 20 to 97% by weight.

The graft copolymer having a branched chain of an alkylene oxide adduct polymer can be prepared in the same manner as in the above-mentioned graft copolymer having a branched chain of a styrenic polymer.

The graft copolymer having a branched chain of a polysiloxane is prepared by copolymerizing a silicone macromer represented by the formula (III):

$$X(Y)_r Si(R^8)_{3-s}(Z)_s \quad \text{(II)}$$

wherein X is a polymerizable unsaturated group; Y is a divalent group; each of $R^8$ is independently hydrogen atom, a lower alkyl group having 1 to 4 carbon atoms, an aryl group having 6 to 12 carbon atoms or an alkoxy group having 1 to 3 carbon atoms; Z is a monovalent siloxane polymer moiety having a number-average molecular weight of about 500 to about 20000; r is 0 or 1; and s is an integer of 1 to 3, the polymerizable unsaturated monomer having a salt-forming group, and a monomer copolymerizable with the silicone macromer represented by the formula (III) and the polymerizable unsaturated monomer having a salt-forming group in the presence of a radical polymerization initiator.

In the silicone macromer represented by the formula (III), X includes polymerizable unsaturated groups such as vinyl group and allyl group. Y includes divalent groups such as —COO— group, a —COO$C_bH_{2b}$— group, wherein b is an integer of 1 to 5, and phenylene group.

The same monomers as those used for the above-mentioned graft copolymer having a branched chain of a styrenic polymer can be exemplified as the polymerizable unsaturated monomer having a salt-forming group.

The same monomers as those used for the above-mentioned graft copolymer having a branched chain of a styrenic polymer can be exemplified as the monomer copolymerizable with the silicone macromer represented by the formula (III) and the polymerizable unsaturated monomer having a salt-forming group.

As to the content of each monomer constituting the graft copolymer having a branched chain of a polysiloxane, it is preferable from the viewpoints of emulsification stability and jetting stability that the content of the silicone macromer represented by the formula (III) is 1 to 20% by weight, the content of the polymerizable unsaturated monomer having a salt-forming group is 2 to 40% by weight, and the content of the monomer copolymerizable with the silicone macromer represented by the formula (III) and the polymerizable unsaturated monomer having a salt-forming group is 40 to 97% by weight.

The graft copolymer having a branched chain of a polysiloxane can be prepared in the same manner as in the above-mentioned graft copolymer having a branched chain of a styrenic polymer.

It is preferable that the weight-average molecular weight of the polymer is 3000 to 100000 from the viewpoints of water resistance after printing, environmental resistance and storage stability. The weight-average molecular weight of the polymer is determined by the method described in Example 1.

The glass transition temperature of the polymer is not limited to specified ones. It is desired that the glass transition temperature of the polymer is low, preferably at most 40° C., more preferably at most 30° C., from the viewpoints of fluorescent intensity and optical density of the printouts. Its reason is as follows:

In accordance with the increase of the content of the fluorescent colorant in the water-based ink, the optical density becomes higher and the fluorescent intensity is also increased. However, the fluorescent intensity is attained to the maximum value, and thereafter decreased.

When the glass transition temperature of the polymer is at most 40° C., the content of the fluorescent colorant in the water-based ink can be increased at the maximum value of the fluorescent intensity. Therefore, even when the content of the fluorescent colorant in the water-based ink is high, the fluorescent intensity of the water-based ink can be maintained to a high level. From this fact, the obtained printouts simultaneously exhibit high optical density and high fluorescent intensity. From these viewpoints, the glass transition temperature of the polymer is preferably at most 40° C., more preferably at most 30° C., still more preferably –40° to 30° C., especially preferably 0° to 30° C. The glass transition temperature is determined by the method described in Example 1.

It is preferable that the fluorescent colorant is water-insoluble or slightly water-soluble from the viewpoint of water resistance.

The fluorescent colorant includes, for instance, florescent dyes such as oil-soluble fluorescent dyes, fluorescent disperse dyes and water-soluble florescent acidic dyes, fluorescent pigments, fluorescent brighteners, and the like. Among them, oil-soluble fluorescent dyes and fluorescent disperse dyes are preferable from the viewpoint of facilitation of containing the fluorescent colorant in the polymer particles.

The kinds of the oil-soluble fluorescent dyes are not limited to specified ones. Preferable examples of the oil-soluble fluorescent dyes include C.I. Solvent Yellow 44, 82 and 116; C.I. Solvent Red 43, 44, 45, 49 and 60, and the like; those commercially available from BASF under the trade names of Lumogen F Yellow 083, Lumogen F Orange 240, Lumogen F Red 300, Lumogen F Violet 570, Thermoplast F Yellow 084, Flourol Red Bk, Fluorol Red Gk, and Neptun Brilliant Yellow 070, and the like.

The kinds of the florescent disperse dyes are not limited to specified ones. Preferable examples of the florescent disperse dyes include C.I. Disperse Yellow 82 and 124; C.I. Disperse Red 60, and the like.

The water-soluble florescent acidic dyes can be used as it is. It is preferable to impart oil-solubility to the water-soluble fluorescent acidic dyes by the amidation with a long-chain alkylamine or the esterification with a long-chain alkyl alcohol from the viewpoint of improvement in the water resistance. This modification can be controlled in accordance with the ionic group of the water-soluble acidic dye. The water-soluble fluorescent acidic dyes are not limited to specified ones, and C.I. Acid Red 52, 92 and the like; C.I. Fluorescent Brighteners 1, 15, 18, 24 and 32; and the like are preferable.

Besides the above-mentioned fluorescent dyes, there can be also used, for instance, C.I. Fluorescent Brightening Agent 14, 24, 30, 32, 52, 54, 69, 79, 84, 85, 86, 87, 90, 104, 112, 113, 114, 119, 121, 134, 135, 152, 166, 167, 168, 169, 191, 192, 201, 204, 214, 216, 217, 218, 223, 226, 229, 234, 236, 239, 240, 242, 257, 260, 271, 290, 310, 311, 312, 313, 314 and 315; p-quaterphenyl; p-terphenyl; 2,5-diphenyloxazole; 2-(1-naphthyl)-5-phenyloxazole; 2-phenyl-5-(4-biphenyl)-1,3,4-oxadiazole; 3-phenyl-7-(1,2-2H-naphthotriazolyl)-coumarin; 3,7-bis(diethylamino) phenoxazonium nitrate; laser dyes such as DTTCI, DNTTCI, HDITCI, IR-125, 132 and 140, H.I.D.C. Iodide, and the like.

The content of the fluorescent colorant in the water-based ink is preferably 1 to 15% by weight, more preferably 3 to 10% by weight, from the viewpoint of imparting appropriate fluorescent intensity to the water-based ink.

There are some methods for preparing the aqueous dispersion of the polymer particles. For example, one method is polymerizing the monomers in water, and the other is dissolving a polymer after polymerization in an organic solvent, and thereafter dispersing the polymer solution in water.

There are some methods for preparing the aqueous dispersion of the polymer particles containing the fluorescent colorant. For example, one method is mixing the fluorescent colorant with the monomers, and thereafter polymerizing the resulting mixture in water, and the other method is dissolving a polymer after polymerization and the fluorescent colorant in an organic solvent, and thereafter dispersing them in water. Concrete processes include, for instance, a process comprising dissolving the polymer and the fluorescent colorant in an organic solvent, adding a neutralizing agent thereto as occasion demands to ionize the salt-forming group of the vinyl polymer, adding water to the resulting mixture, and thereafter distilling off the organic solvent to phase-invert to a water-based system (phase-inversion emulsification method); a process comprising dissolving the fluorescent colorant and the vinyl polymer having a salt-forming group in a water-insoluble organic solvent, adding water, a neutralizing agent and, as occasion demands, a surfactant to the resulting solution to ionize the salt-forming group of the vinyl polymer, emulsifying the resulting mixture using an emulsifier such as a microfluidizer, and thereafter distilling off the water-insoluble organic solvent from the resulting emulsion (forced emulsification method); and the like. The present invention is not limited only to these processes.

When the graft copolymer is prepared, it is preferable that the phase-inversion emulsification method or the forced emulsification method is employed from the viewpoint of obtaining a graft copolymer in which a large amount of the fluorescent colorant can be contained more stably.

It is desired that the average particle diameter of the polymer particles as determined by the testing method described in Example 1 is at most 2 $\mu$m, preferably 0.03 to 2 $\mu$m, more preferably 0.1 to 0.2 $\mu$m, from the viewpoint of dispersion stability.

The content of the polymer particles in the water-based ink is not limited to specified ones, as long as sufficient optical density is exhibited. It is desired that the content is usually 1 to 30% by weight, preferably 2 to 10% by weight, more preferably 2 to 8% by weight, from the viewpoint of imparting sufficient jetting stability and optical density to the printouts.

The content of the fluorescent colorant in the polymer particles containing the fluorescent colorant is preferably 0.1 to 30% by weight, more preferably 0.5 to 10% by weight.

To the water-based ink of the present invention can be added various known additives, for instance, a wetting agent such as polyhydric alcohols, a dispersant, a defoaming agent, a mildewproof agent, a chelating agent, a pH adjusting agent and the like as occasion demands.

EXAMPLES

Example 1

A dropping funnel was attached to a 500-mL separable flask, and nitrogen gas replacement was sufficiently carried out. Thereafter, the flask was charged with 30 g of methyl methacrylate, 2 g of acrylic acid, 8 g of methoxypolyethylene glycol methacrylate (number of moles of ethylene oxides added: 9 mol, commercially available from Shin-Nakamura Chemical Co., Ltd. under the trade name of NK ESTER M-90G), 0.4 g of 2-mercaptoethanol and 10 g of 2-butanone, and the temperature was raised to 60° C. with reflux.

A dropping funnel was charged with 120 g of methyl methacrylate, 8 g of acrylic acid, 32 g of methoxypolyethylene glycol methacrylate (number of moles of ethylene oxides added: 9 mol, commercially available from Shin-Nakamura Chemical Co., Ltd. under the trade name of NK ESTER M-90G), 1.6 g of 2-mercaptoethanol, 1.6 g of 2,2'-azobis(2,4-dimethylvaleronitrile) and 40 g of 2-butanone, and the mixture in the dropping funnel was added dropwise to the flask at 60° C. over a period of 3 hours. Thereafter, the resulting solution was aged at 60° C. for 2 hours, and a mixture of 0.4 g of 2,2'-azobis(2,4-dimethylvaleronitrile) and 1.0 g of 2-butanone was added thereto. The resulting mixture was further aged at 60° C. for 2 hours.

After the termination of the aging, the mixture was cooled to 25° C., and 150 g of 2-butanone was added thereto, to give a solution of a vinyl polymer having a weight-average molecular weight of 6500 obtained by a solution polymerization method. The vinyl polymer had a grafted side chain of an alkylene oxide adduct polymer.

The weight-average molecular weight as referred to herein was determined by subjecting a part of the resulting vinyl polymer solution to gel permeation chromatography using polystyrene as a standard substance, and 1 mmol/L dodecyldimethylamine-containing chloroform as a solvent.

A part of the resulting vinyl polymer solution was taken and dried with a hot-air dryer at 105° C. for 3 hours. Thereafter, its glass transition temperature was determined by the following method. The results are shown in Table 1.

[Determination Method for Glass Transition Temperature]

The glass transition temperature was determined using a differential scanning calorimeter DSC, commercially available from Seiko Instruments, Inc. under the trade name of EXSTAR6000. From the resulting DSC curve, an extrapolated initiation temperature $Tg^f$ and an extrapolated end temperature $Tg^e$ were read off in accordance with the method as prescribed in JIS K-7121, and its midpoint $Tg^m$ was defined as a glass transition temperature.

Next, 0.03 g of an oil-soluble fluorescent dye commercially available from BASF under the trade name of Lumogen F Red 300 was dissolved in 10 g of toluene at 25° C. To the resulting solution was added 1.94 g of the vinyl polymer solution obtained above, and the mixture was sufficiently stirred to dissolve.

After having confirmed the dissolution, 0.67 g of a 1 N-aqueous potassium hydroxide and 50 g of purified water were added thereto, and the mixture was sufficiently stirred. After the termination of stirring, the mixture was emulsified with an ultrasonic homogenizer at an electric current of 400 $\mu$A for 20 minutes. Thereafter, the resulting emulsion was heated to 60° C., and its pressure was reduced to 0.02 MPa to remove toluene and 2-butanone. Finally, the mixture was filtered with a filter having a pore diameter of 0.8 $\mu$m, to give an aqueous dispersion of vinyl polymer particles containing an oil-soluble fluorescent dye by a forced emulsification method.

Next, there were mixed 8% by weight of the resulting aqueous dispersion of vinyl polymer particles, 10% by weight of trimethylglycine, 5% by weight of urea, 1% by weight of sodium 2-ethylhexyl sulfosuccinate and 76% by weight of purified water, to give a water-based ink. The physical properties of the resulting water-based ink were evaluated in accordance with the following testing methods. The results are shown in Table 1.

An inkjet printer cartridge (commercially available from CANON INC. under the trade name of BCI-21e) was charged with a water-based ink, and the inkjet printer cartridge was loaded on a bubble jet printer (commercially available from CANON INC. under the model number of BJC-430J).

① Average Particle Diameter

The average particle diameter was obtained by cumulant analysis using a dynamic light scattering particle size distribution analyzer commercially available from Otsuka Denshi K.K. under the trade name of ELS-8000. As the determination conditions, a temperature of 25° C., an angle of incidence of 90°, a total integrated count of 100 times, a refractive index of water (1.333) which was a dispersing solvent were inputted to the particle size distribution analyzer. As a standard substance, one commercially available from Seradyn under the trade name of Uniform Microparticles (particle diameter: 204 nm) was used.

② Fluorescent Intensity and Optical Density

Solid printing was carried out on a plain paper (commercially available from CANON INC. under the trade name of The Plain Paper for Inkjet Printing PB Paper) and on high-resolution coated paper (commercially available from CANON INC. under the trade name of The High Resolution Paper HR-101), and sufficiently dried. After drying, the intensity of a fluorescence having a wavelength of 600 nm to an excitation light having a wavelength of 400 nm was determined by a fluorescence spectrophotometer commercially available from Hitachi Ltd. under the trade name of F-4010. The optical density (OD) was determined by using Macbeth densitometer commercially available from Macbeth Process Measurements Co. under the product number of RD918.

③ Retention Ratio of Water Resistance

The printouts on a paper sheet for plain paper copy were soaked in purified water at room temperature for 10 minutes, and thereafter water was sufficiently removed from the printouts. The printouts were air-dried. The fluorescent intensities before and after the test were determined, and the retention ratio was calculated in accordance with the following equation (1):

$$[\text{Retention Ratio}] \, (\%) = \frac{[\text{Determination Value After Test}]}{[\text{Determination Value Before Test}]} \times 100 \quad (1)$$

④ Retention Ratio of Environmental Resistance

The printouts on a paper sheet for plain paper copy were allowed to stand at 40° C. and a relative humidity of 70% for 24 hours. The fluorescent intensities before and after the test were determined, and the retention ratio was calculated in accordance with the above-mentioned equation (1).

⑤ Storage Stability

A bottle made of a fluorocarbon resin was charged with the water-based ink, and the bottle was kept at 60° C. for 3 months. Viscosities, surface tensions, pHs and average particle diameters before and after the test were determined, and the retention ratio in each physical property was calculated in accordance with the above-mentioned equation (1). The devices used for the determination of each physical property besides the average particle diameter are as follows:

Viscometer: commercially available from Toki Sangyo K.K. under the trade name of VISCOMETER RE-80L
Surface tension meter: commercially available from Kyowa Kaimen Kagaku K.K. under the trade name of AUTOMATIC Surface Tensiometer CBVP-Z pH determination device: commercially available from Horiba LTD. under the trade name of HORIBA pH/ION meter F-23

⑥ Clogging (Inkjetting Property)

After printing, the printer head was taken out from the printer, and the printer head-removed printer was allowed to stand at room temperature (23° C.) and a relative humidity of 50% for 24 hours. The printer head was then re-attached to the printer, and printing was carried out. Those which were free from any blurriness or omissions in printing were evaluated as "acceptable," and those which had blurriness and omissions were evaluated as "rejected."

Example 2

A dropping funnel was attached to a 500-mL separable flask, and nitrogen gas replacement was sufficiently carried out. Thereafter, the flask was charged with 30 g of butyl methacrylate, 2 g of methacrylic acid, 8 g of isobutyl methacrylate macromer (number-average molecular weight: 6000, commercially available from TOAGOSEI CO., LTD. under the trade name of AW-6S), 0.4 g of 2-mercaptoethanol and 10 g of 2-butanone, and the temperature was raised to 60° C. with reflux. A dropping funnel was charged with 120 g of butyl methacrylate, 8 g of methacrylic acid, 32 g of the isobutyl methacrylate macromer, 1.6 g of 2-mercaptoethanol, 1.6 g of 2,2'-azobis(2,4-dimethylvaleronitrile) and 40 g of 2-butanone, and the mixture in the dropping funnel was added dropwise to the flask at 60° C. over a period of 3 hours.

After the termination of the dropwise addition, a mixture of 0.4 g of 2,2'-azobis(2,4-dimethylvaleronitrile) and 1.0 g of 2-butanone was added to the solution, and the resulting solution was aged at 60° C. for 2 hours. The mixture was further aged at 60° C. for 2 hours. After the termination of the aging, the solution was cooled to 25° C., and 150 g of 2-butanone was added thereto, to give a solution of a vinyl polymer having a weight-average molecular weight of 6000 polymerized by a solution polymerization method. The vinyl polymer had a grafted side chain of an alkyl methacrylate.

Next, 0.03 g of an oil-soluble fluorescent dye commercially available from BASF under the trade name of Lumogen F Orange 240 was dissolved in 10 g of 2-butanone at 25° C. To the resulting solution was added 1.94 g of the vinyl polymer solution obtained above, and the mixture was sufficiently stirred to dissolve.

After having confirmed the dissolution, 0.67 g of a 1 N-aqueous potassium hydroxide and 50 g of purified water were added thereto, and the mixture was sufficiently stirred. After the termination of stirring, the temperature of the resulting mixture was raised to 60° C., and the pressure was reduced to 0.02 MPa to remove 2-butanone. Finally, the mixture was filtered with a filter having a pore diameter of 0.8 $\mu$m, to give an aqueous dispersion of vinyl polymer particles containing an oil-soluble fluorescent dye by a phase-inversion emulsification method.

A water-based ink was prepared in the same manner as in Example 1 from the resulting aqueous dispersion. The physical properties of the water-based ink were evaluated in the same manner as in Example 1. The results are shown in Table 1.

Example 3

A dropping funnel was attached to a 500-mL separable flask, and nitrogen gas replacement was sufficiently carried out. Thereafter, the flask was charged with 30 g of n-butyl methacrylate, 2 g of methacrylic acid, 8 g of styrene macromer (number-average molecular weight: 6000, commercially available from TOAGOSEI CO., LTD. under the trade name of AS-6S, a 50% by weight toluene solution of AS-6S), 0.4 g of 2-mercaptoethanol and 10 g of 2-butanone, and the temperature was raised to 60° C. with reflux. A dropping funnel was charged with 120 g of n-butyl methacrylate, 8 g of methacrylic acid, 32 g of the styrene macromer, 1.6 g of 2-mercaptoethanol, 1.6 g of 2,2'-azobis (2,4-dimethylvaleronitrile) and 40 g of 2-butanone, and the mixture in the dropping funnel was added dropwise to the flask at 60° C. over a period of 3 hours.

After the termination of the dropwise addition, the resulting mixture was aged at 60° C. for 2 hours, and a mixture of 0.4 g of 2,2'-azobis(2,4-dimethylvaleronitrile) and 1.0 g of 2-butanone was added thereto. The mixture was further aged at 60° C. for 2 hours. After the termination of the aging, the mixture was cooled to 25° C., and 150 g of 2-butanone was added thereto, to give a solution of a vinyl polymer having a weight-average molecular weight of 6000 obtained by a solution polymerization method. The vinyl polymer had a grafted side chain of a styrenic polymer.

Next, 0.03 g of an oil-soluble fluorescent dye commercially available from BASF under the trade name of Lumogen F Orange 240 was dissolved in 10 g of methyl isobutyl ketone at 25° C. To the resulting solution was added 1.94 g of the vinyl polymer solution obtained above, and the mixture was sufficiently stirred to dissolve.

After having confirmed the dissolution, 0.67 g of a 1 N-aqueous potassium hydroxide and 50 g of purified water were added thereto, and the mixture was sufficiently stirred. After the termination of stirring, the mixture was emulsified with an ultrasonic homogenizer at an electric current of 400 μA for 20 minutes. Thereafter, the resulting emulsion was heated to 60° C., and its pressure was reduced to 0.02 MPa to remove 2-butanone and methyl isobutyl ketone. Finally, the mixture was filtered with a filter having a pore diameter of 0.8 μm, to give an aqueous dispersion of vinyl polymer particles containing an oil-soluble fluorescent dye by a forced emulsification method.

A water-based ink was prepared from the resulting aqueous dispersion in the same manner as in Example 1. The physical properties of the water-based ink were evaluated in the same manner as in Example 1. The results are shown in Table 1.

Example 4

A dropping funnel was attached to a 500-mL separable flask, and nitrogen gas replacement was sufficiently carried out. Thereafter, the flask was charged with 30 g of n-butyl methacrylate, 2 g of methacrylic acid, 8 g of a silicone macromer (number-average molecular weight: 6000, commercially available from CHISSO CORPORATION under the trade name of FM-0711), 0.4 g of 2-mercaptoethanol and 10 g of 2-butanone, and the temperature was raised to 60° C. with reflux. A dropping funnel was charged with 120 g of n-butyl methacrylate, 8 g of methacrylic acid, 32 g of the silicone macromer, 1.6 g of 2-mercaptoethanol, 1.6 g of 2,2'-azobis(2,4-dimethylvaleronitrile) and 40 g of 2-butanone, and the mixture in the dropping funnel was added dropwise to the flask at 60° C. over a period of 3 hours.

After the termination of the dropwise addition, the resulting solution was aged at 60° C. for 2 hours, and a mixture of 0.4 g of 2,2'-azobis(2,4-dimethylvaleronitrile) and 1.0 g of 2-butanone was added thereto. The mixture was further aged at 60° C. for 2 hours. After the termination of the aging, the mixture was cooled to 25° C., and 150 g of 2-butanone was added thereto, to give a solution of a vinyl polymer having a weight-average molecular weight of 6000 obtained by a solution polymerization method. The vinyl polymer had a grafted side chain of a polysiloxane.

Next, 0.03 g of an oil-soluble fluorescent dye commercially available from BASF under the trade name of Lumogen F Orange 240 was dissolved in 10 g of methyl isobutyl ketone at 25° C. To the resulting solution was added 1.94 g of the vinyl polymer solution obtained above, and the mixture was sufficiently stirred to dissolve.

After having confirmed the dissolution, 0.67 g of a 1 N-aqueous potassium hydroxide and 50 g of purified water were added thereto, and the mixture was sufficiently stirred. After the termination of stirring, the mixture was emulsified with an ultrasonic homogenizer at an electric current of 400 μA for 20 minutes. Thereafter, the resulting emulsion was heated to 60° C., and its pressure was reduced to 0.02 MPa to remove 2-butanone and methyl isobutyl ketone. Finally, the mixture was filtered with a filter having a pore diameter of 0.8 μm, to give an aqueous dispersion of vinyl polymer particles containing an oil-soluble fluorescent dye by a forced emulsification method.

A water-based ink was prepared from the resulting aqueous dispersion in the same manner as in Example 1. The physical properties of the water-based ink were evaluated in the same manner as in Example 1. The results are shown in Table 1.

Example 5

A dropping funnel was attached to a 500-mL separable flask, and nitrogen gas replacement was sufficiently carried out. Thereafter, the flask was charged with 30 g of ethyl methacrylate, 2 g of acrylic acid, 8 g of isobutyl methacrylate macromer (number-average molecular weight: 6000, commercially available from TOAGOSEI CO., LTD. under the trade name of AW-6S), 0.4 g of 2-mercaptoethanol and 10 g of 2-butanone, and the temperature was raised to 60° C. with reflux.

A dropping funnel was charged with 120 g of ethyl methacrylate, 8 g of acrylic acid, 32 g of the isobutyl methacrylate macromer, 1.6 g of 2-mercaptoethanol, 1.6 g of 2,2'-azobis(2,4-dimethylvaleronitrile) and 40 g of 2-butanone, and the mixture in the dropping funnel was added dropwise to the flask at 60° C. over a period of 3 hours. Thereafter, the resulting solution was aged at 60° C. for 2 hours, and a mixture of 0.4 g of 2,2'-azobis(2,4-dimethylvaleronitrile) and 1.0 g of 2-butanone was added thereto. The mixture was further aged at 60° C. for 2 hours.

After the termination of the aging, the mixture was cooled to 25° C., and 150 g of 2-butanone was added thereto, to give a solution of a vinyl polymer having a weight-average molecular weight of 6500 polymerized by a solution polymerization method. The vinyl polymer had a grafted side chain of an alkyl methacrylate.

Next, 0.03 g of an oil-soluble fluorescent dye commercially available from BASF under the trade name of Lumogen F Red 300 was dissolved in 10 g of toluene at 25° C. To the resulting solution was added 1.94 g of the vinyl polymer solution obtained above, and the mixture was sufficiently stirred to dissolve.

After having confirmed the dissolution, 0.67 g of a 1 N-aqueous potassium hydroxide and 50 g of purified water were added thereto, and the mixture was sufficiently stirred. After the termination of stirring, the mixture was emulsified with an ultrasonic homogenizer at an electric current of 400 μA for 20 minutes. Thereafter, the resulting emulsion was heated to 60° C., and its pressure was reduced to 0.02 MPa to remove toluene and 2-butanone. Finally, the mixture was filtered with a filter having a pore diameter of 0.8 μm, to give an aqueous dispersion of vinyl polymer particles containing an oil-soluble fluorescent dye by a forced emulsification method.

Next, there were mixed 8% by weight of the resulting aqueous dispersion of vinyl polymer particles, 10% by weight of trimethylglycine, 5% by weight of urea, 1% by weight of sodium 2-ethylhexyl sulfosuccinate and 76% by weight of purified water, to give a water-based ink. The physical properties of the resulting water-based ink were evaluated in the same manner as in Example 1. The results are shown in Table 1.

Example 6

A dropping funnel was attached to a 500-mL separable flask, and nitrogen gas replacement was sufficiently carried out. Thereafter, the flask was charged with 30 g of styrene, 2 g of methacrylic acid, 8 g of methoxypolyethylene glycol methacrylate (number of moles of ethylene oxides added: 9 mol, commercially available from Shin-Nakamura Chemical Co., Ltd. under the trade name of NK ESTER M-90G), 0.4 g of 2-mercaptoethanol and 10 g of 2-butanone, and the temperature was raised to 60° C. with reflux. A dropping funnel was charged with 120 g of styrene, 8 g of methacrylic acid, 32 g of the methoxypolyethylene glycol methacrylate, 1.6 g of 2-mercaptoethanol, 1.6 g of 2,2'-azobis(2,4-dimethylvaleronitrile) and 40 g of 2-butanone, and the mixture in the dropping funnel was added dropwise to the flask at 70° C. over a period of 3 hours.

After the termination of the dropwise addition, the resulting solution was aged at 70° C. for 2 hours, and a mixture of 0.4 g of 2,2'-azobis(2,4-dimethylvaleronitrile) and 1.0 g of 2-butanone was added thereto. The mixture was further aged at 70° C. for 2 hours. After the termination of the aging, the solution was cooled to 25° C., and 150 g of 2-butanone was added thereto, to give a solution of a vinyl polymer having a weight-average molecular weight of 6000 polymerized by a solution polymerization method. The vinyl polymer had a grafted side chain of an alkyl methacrylate.

Next, 0.03 g of an oil-soluble fluorescent dye commercially available from BASF under the trade name of Lumogen F Orange 240 was dissolved in 10 g of 2-butanone at 25° C. To the resulting solution was added 1.94 g of the vinyl polymer solution obtained above, and the mixture was sufficiently stirred to dissolve.

After having confirmed the dissolution, 0.67 g of a 1 N-aqueous potassium hydroxide and 50 g of purified water were added thereto, and the mixture was sufficiently stirred. After the termination of stirring, the temperature of the mixture was raised to 60° C., and the pressure was reduced to 0.02 MPa to remove 2-butanone. Finally, the mixture was filtered with a filter having a pore diameter of 0.8 μm, to give an aqueous dispersion of vinyl polymer particles containing an oil-soluble fluorescent dye by a phase-inversion emulsification method.

A water-based ink was prepared from the resulting aqueous dispersion in the same manner as in Example 1. The physical properties of the water-based ink were evaluated in the same manner as in Example 1. The results are shown in Table 1.

Example 7

A dropping funnel was attached to a 500-mL separable flask, and nitrogen gas replacement was sufficiently carried out. Thereafter, the flask was charged with 30 g of ethyl methacrylate, 2 g of methacrylic acid, 8 g of a silicone macromer (number-average molecular weight: 6000, commercially available from CHISSO CORPORATION under the trade name of FM-0711), 0.4 g of 2-mercaptoethanol and 10 g of 2-butanone, and the temperature was raised to 60° C. with reflux. A dropping funnel was charged with 120 g of ethyl methacrylate, 8 g of methacrylic acid, 32 g of the silicone macromer, 1.6 g of 2-mercaptoethanol, 1.6 g of 2,2'-azobis(2,4-dimethylvaleronitrile) and 40 g of 2-butanone, and the mixture in the dropping funnel was added dropwise to the flask at 60° C. over a period of 3 hours.

After the termination of the dropwise addition, the resulting solution was aged at 60° C. for 2 hours, and a mixture of 0.4 g of 2,2'-azobis(2,4-dimethylvaleronitrile) and 1.0 g of 2-butanone was added thereto. The mixture was further aged at 60° C. for 2 hours. After the termination of the aging, the mixture was cooled to 25° C., and 150 g of 2-butanone was added thereto, to give a solution of a vinyl polymer having a weight-average molecular weight of 6000 obtained by a solution polymerization method. The vinyl polymer had a grafted side chain of a polysiloxane.

Next, 0.03 g of an oil-soluble fluorescent dye commercially available from BASF under the trade name of Lumogen F Orange 240 was dissolved in 10 g of methyl isobutyl ketone at 25° C. To the resulting solution was added 1.94 g of the vinyl polymer solution obtained above, and the mixture was sufficiently stirred to dissolve.

After having confirmed the dissolution, 0.67 g of a 1 N-aqueous potassium hydroxide and 50 g of purified water were added thereto, and the mixture was sufficiently stirred. After the termination of stirring, the mixture was emulsified with an ultrasonic homogenizer at an electric current of 400 μA for 20 minutes. Thereafter, the resulting emulsion was heated to 60° C., and its pressure was reduced to 0.02 MPa to remove methyl isobutyl ketone and 2-butanone. Finally, the mixture was filtered with a filter having a pore diameter of 0.8 μm, to give an aqueous dispersion of vinyl polymer particles containing an oil-soluble fluorescent dye by a forced emulsification method.

A water-based ink was prepared from the resulting aqueous dispersion in the same manner as in Example 1. The physical properties of the water-based ink were evaluated in the same manner as in Example 1. The results are shown in Table 1.

Comparative Example 1

A water-based ink was composed of 0.24% by weight of a water-soluble acidic dye having fluorescence (C.I. Acid Red 92, Orient Chemical Co., Ltd. under the trade name of Water Pink 2), 10% by weight of trimethylglycine, 5% by weight of urea, 1% by weight of sodium 2-ethylhexyl sulfosuccinate and 83.76% by weight of purified water. The physical properties of the resulting water-based ink were evaluated in the same manner as in Example 1. The results are shown in Table 1.

Comparative Example 2

A paint shaker was charged with 20 g of a pigment having fluorescence commercially available from SINLOIHI under the trade name of FM-17, a naphthalenesulfonate-based polymer dispersant commercially available from Kao Corporation under the trade name: Demol N and 120 g of ion-exchanged water, and the pigment was dispersed at 25° C. for 3 hours. The dispersion was centrifuged, and filtered with a filter having a pore diameter of 1.2 μm. The physical properties of the water-based ink were evaluated in the same manner as in Example 1. The results are shown in Table 1.

TABLE 1

| | | | | | | | Storage Stability | | | | |
|---|---|---|---|---|---|---|---|---|---|---|---|
| | Glass Transition Temperature (°C.) | Average Particle Diameter (nm) | Fluorescent Intensity (–) | Retention Ratio (%) of Water Resistance | Optical Density | Retention Ratio (%) of Environmental Resistance | Retention Ratio (%) of Viscosity | Retention Ratio (%) of Surface Tension | Retention Ratio (%) of pH | Retention Ratio (%) of Average Particle Diameter | Clogging |
| Ex. No. | | | | | | | | | | | |
| 1 | 3.2 | 80 | 450 | 100 | 0.53 | 100 | 100 | 100 | 100 | 100 | Acceptable |
| 2 | 31.8 | 95 | 520 | 100 | 0.51 | 100 | 100 | 100 | 100 | 100 | Acceptable |
| 3 | 13.6 | 110 | 500 | 100 | 0.50 | 100 | 100 | 100 | 100 | 100 | Acceptable |
| 4 | −30.4 | 230 | 480 | 100 | 0.49 | 100 | 100 | 100 | 100 | 100 | Acceptable |
| 5 | 36.9 | 97 | 450 | 100 | 0.52 | 100 | 100 | 100 | 100 | 100 | Acceptable |
| 6 | 23.6 | 86 | 470 | 100 | 0.53 | 100 | 100 | 100 | 100 | 100 | Acceptable |
| 7 | 3.3 | 75 | 560 | 100 | 0.49 | 100 | 100 | 100 | 100 | 100 | Acceptable |
| Comp. Ex. No. | | | | | | | | | | | |
| 1 | — | — | 350 | 23 | 0.52 | 35 | 100 | 100 | 100 | 100 | Acceptable |
| 2 | — | 87 | 410 | 100 | 0.25 | 100 | 85 | 98 | 90 | 70 | Rejected |

It can be seen from the results shown in Table 1 that the water-based inks obtained in Examples 1 to 7 are excellent in any of fluorescent intensity, water resistance, environmental resistance, storage stability and exhibit no clogging (inkjetting property).

On the other hand, the ink obtained in Comparative Example 1 in which the water-soluble acidic dye having fluorescence is used and the aqueous dispersion of the polymer particles is not contained gives printouts deteriorated water resistance and environmental resistance.

Also, the ink obtained in Comparative Example 2 in which the pigment having fluorescence is used and the aqueous dispersion of the polymer particles is not used shows poor storage stability and clogging.

The water-based ink of the present invention gives printouts sufficient fluorescent intensity and excellent water resistance and environmental resistance, and is excellent in storage stability for a long period of time. Also, the water-based ink of the present invention exhibits an excellent effect that stable inkjetting property is secured in inkjet recording.

What is claimed is:

1. A water-based ink comprising an aqueous dispersion of polymer particles comprising a polymer obtained by a solution polymerization, a bulk polymerization method or a suspension polymerization method, and a fluorescent colorant, wherein the polymer is a vinyl-based graft copolymer which has at least one branched chain selected from the group consisting of styrenic polymers, alkyl acrylate polymers, alkylene oxide adduct polymers and polysiloxanes, and wherein the polymer has a glass transition temperature of at most 13.6° C.

2. The water-based ink according to claim 1, wherein the aqueous dispersion of the polymer particles is obtained by a phase-inversion emulsification method or a forced emulsification method.

3. The water-based ink according to claim 1, wherein the fluorescent colorant is contained in the polymer particles.

4. A method of recording with an ink comprising recording with the water-based ink according to claim 1.

5. The method according to claim 4, wherein the recording is inkjet recording.

* * * * *